United States Patent [19]
Johnson et al.

[11] Patent Number: 5,368,258
[45] Date of Patent: Nov. 29, 1994

[54] ARRANGEMENT FOR MAINTAINING LAMINAR AIR FLOW OVER GAPS IN AIRCRAFT ENGINE NACELLE SURFACES

[75] Inventors: Warren A. Johnson, San Diego; Geoffrey A. Harding, Chula Vista, both of Calif.

[73] Assignee: Rohr, Inc., Chula Vista, Calif.

[21] Appl. No.: 102,321

[22] Filed: Aug. 5, 1993

[51] Int. Cl.⁵ ............................................. B64C 21/06
[52] U.S. Cl. .................................... 244/130; 244/209
[58] Field of Search ...................... 244/208, 209, 129.1, 244/129.4, 131, 130

[56] References Cited

U.S. PATENT DOCUMENTS

| | | | |
|---|---|---|---|
| 2,925,231 | 2/1960 | Pfaff et al. | 244/209 |
| 3,117,751 | 1/1964 | Rogers et al. | 244/209 |
| 3,366,352 | 1/1968 | Edwards et al. | 244/130 |
| 4,296,899 | 10/1981 | Isenberg | 244/130 |
| 5,014,934 | 5/1991 | McClaflin | 244/129.4 |
| 5,065,960 | 11/1991 | Castellucci | 244/130 |
| 5,114,103 | 5/1992 | Coffinberry | 244/209 |

FOREIGN PATENT DOCUMENTS

| | | | |
|---|---|---|---|
| 853387 | 10/1952 | Germany | 244/208 |
| 511650 | 8/1939 | United Kingdom | 244/209 |

*Primary Examiner*—Galen L. Barefoot
*Attorney, Agent, or Firm*—Patrick J. Schlesinger; Frank D. Gilliam

[57] ABSTRACT

A system for eliminating turbulence in aerodynamic surfaces, such as engine nacelles, resulting from air passing over joints and gaps in the aerodynamic surface. Basically, this system includes a suction chamber within the nacelle and extending along the inner skin wall adjacent to gaps or joints, such as around access doors, at the interface between the nose cowl and the fan cowl door, etc. Typically, a series of apertures extend through a top portion of the suction chamber below the gap to permit air to pass from the gap to the suction chamber. At least one duct communicates with the chamber and extends to a suction pump. In operation, the pump sucks air through the duct, suction chamber, apertures and gap, to prevent the formation of a transition from low drag laminar flow to high drag turbulent flow at the gap.

10 Claims, 2 Drawing Sheets

ARRANGEMENT FOR MAINTAINING LAMINAR AIR FLOW OVER GAPS IN AIRCRAFT ENGINE NACELLE SURFACES

BACKGROUND OF THE INVENTION

This invention relates in general to the reduction in drag over an aircraft engine nacelle and more particularly, but not by way of limitation, to an arrangement for the maintenance of laminar flow over a nacelle surface having gaps in the surface.

Roughly half of the drag an aircraft experiences in flight is due to skin friction. Great efforts are expended in attempting to reduce drag because of the fuel savings resulting from any reduction. It has been estimated that about 4% of the drag experienced by aircraft using gas turbine engines mounted on the aircraft through a wing or fuselage mounted pylon results from freestream flow of air over the engine nacelle.

A large number of designs have been developed by engineers seeking to reduce aircraft and nacelle drag. Nacelles have been shaped to provide maximum natural laminar flow, such as the design described by Lahti, et al in U.S. Pat. No. 4,799,633.

Attempts have been made to blow air out through holes in an aircraft wing from within the wing to reduce drag, such as is described by Fleischmann in U.S. Pat. No. 2,873,931. Axially directed ridges have been placed on an aerodynamic surface to direct air flow in a manner to reduce drag, as disclosed by Rethorst, in U.S. Pat. No. 3,588,005. Mechanisms within an aircraft wing have been provided to change the airfoil shape during flight to optimize the wing for flight conditions, e.g., cruise, take-off and landing, as described by Readnour et al in U.S. Pat. No. 5,000,399. While these systems often reduce drag somewhat, the improvement tends to be limited to smooth surfaces, since surface irregularities such as skin gaps or recesses often cause local transition from laminar to turbulent flow.

A great variety of structures involving sucking air inwardly through a porous aerodynamic surface have been developed and endeavor to reduce drag by maintaining laminar flow along the aerodynamic surface. Typically, Dannenberg in U.S. Pat. No. 3,128,973 shows wing panels having a porous surface through which air can be drawn into the wing interior. Glaze shows, in U.S. Pat. No. 3,056,432, permeable woven wire material forming longitudinal portions of an aircraft wing skin. It is also known to provide longitudinal slots in an aircraft wing through which air can be drawn into the wing interior. Although these systems may beneficially encourage laminar flow over small areas or along longitudinal lines, problems remain with obtaining uniform inward flow over large areas. Also, many of the prior systems for drawing air into a wing or the like present a rough surface or surface discontinuities that will tend to increase drag. Further, these systems are useful only over large, smooth surfaces, such as aircraft wings, and cannot accommodate turbulence inducing gaps in the surfaces, such as the inherent gaps around movable doors or panels.

Rose, et al describe, in U.S. Pat. No. 4,479,150, a boundary layer control system for use in a nacelle that provides a layer of honeycomb sound suppression material on the internal surface of the nacelle skin. A porous skin made up of a fine woven mesh is adhesively bonded to a perforated aluminum sheet. The honeycomb sound suppression system is bonded to the opposite side of the aluminum sheet. Suction headers engage the inside surface of the honeycomb, with an impermeable skin between headers. Honeycomb walls are partially cut-away to permit airflow through the honeycomb cell walls and the perforated sheet to reach the headers. While generally effective, this system tends to be primarily useful over the smooth, forward portions of an engine nacelle. Once the laminar flow reaches the interface between the aft edge of the nose cowl and the forward edge of fan cowl, with the inherent irregular gap therebetween, or access doors and the like with peripheral gaps or recesses, the laminar flow quickly deteriorates into turbulent flow.

Thus, there is a continuing need for a system for eliminating the interference with laminar flow that results from skin surface gaps or recesses, especially where other suction systems are used over the smooth forward portion of the nacelle. While laminar flow often continues well aft of the aft end of an active surface suction system, any significant surface irregularity in the extended area can cause immediate transition to turbulent flow.

SUMMARY OF THE INVENTION

The above noted problems, and others, are overcome in accordance with this invention by a laminar air flow inducing system for use in regions where a nacelle skin has gaps, joints, recesses or other linear irregularities (hereinafter collectively termed "gaps") which basically comprises a chamber running along the gap on the interior surface of the nacelle skin, a plurality of holes through any backing on the gap, communicating between chamber and gap, at least one suction duct extending between the chamber and a suction or vacuum pump, said pump capable of drawing air through the duct, chamber, holes and gap to prevent the initiation of turbulent flow at the gap and maintaining laminar flow.

In some cases the gap results from overlapping edges, such as around an access door or panel, where the panel skin overlaps a recessed edge in the nacelle skin leaving a gap along the edge of the panel skin. The chamber cannot be permanently secured to the panel, which must be removable. In that case, a seal is interposed between the panel and chamber wall to assure a closed chamber when the panel is in place. The chamber generally is continuous all around the edge of the access panel.

BRIEF DESCRIPTION OF THE DRAWINGS

Details of the invention, and of certain preferred embodiments thereof, will be further understood upon reference to the drawing, wherein.

DETAILED DESCRIPTION OF PREFERRED EMBODIMENTS

Figure 1:
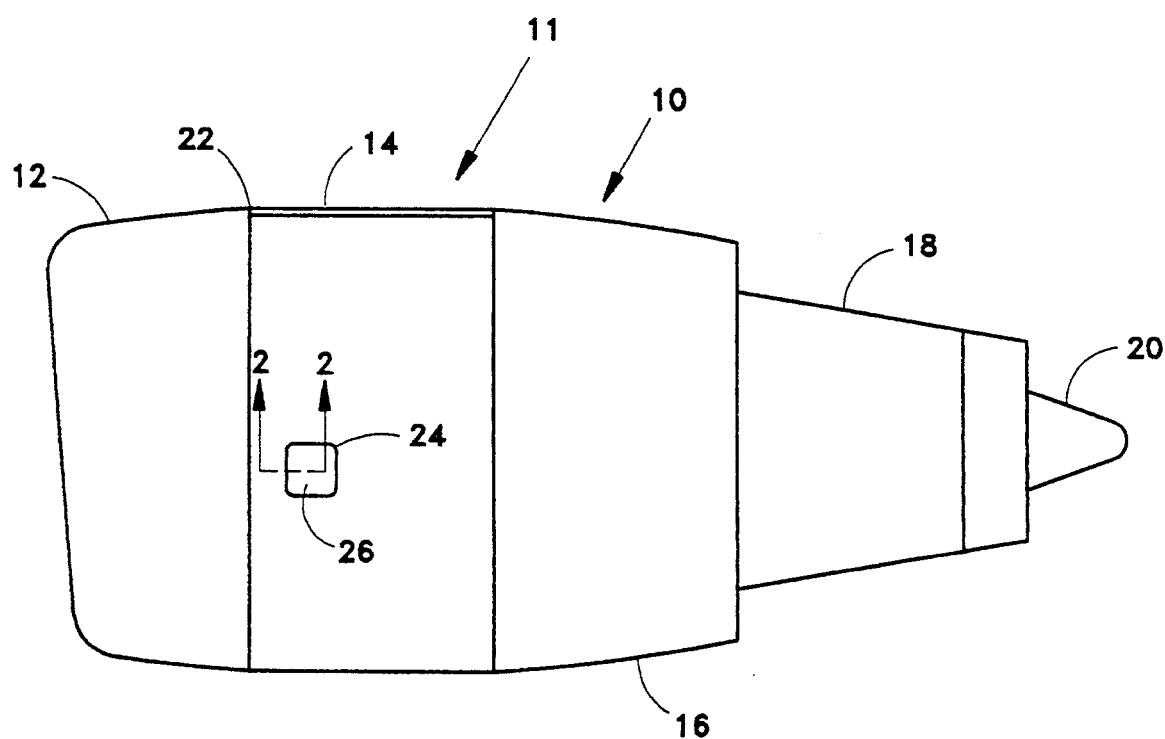
FIG. 1 is a schematic side elevation of a typical prior art turbofan aircraft engine of the type with which this invention is useful.

Referring now to FIG. 1, there is seen a typical turbofan aircraft engine 10 of the type that is mounted on an aircraft by means of a wing or fuselage mounted pylon.

The engine is surrounded by a nacelle system 11 including a nose cowl 12, a fan cowl 14 surrounding a turbofan engine (not seen) and a fan reverser 16. For lowest drag, the nose cowl 12 and fan cowl 14 are designed to maintain laminar flow to the maximum extent possible. The nacelle system 11 further includes a core cowl 18 surrounding the core engine (not seen) and a center body 20.

As detailed below, there is an inherent gap or recess 22 between nose cowl 12 and fan cowl 14. Another gap 24 occurs around each access panel 26. Of course, other access panels 26 may be installed at various locations on the nacelle system 11 as needed.

Figure 2:
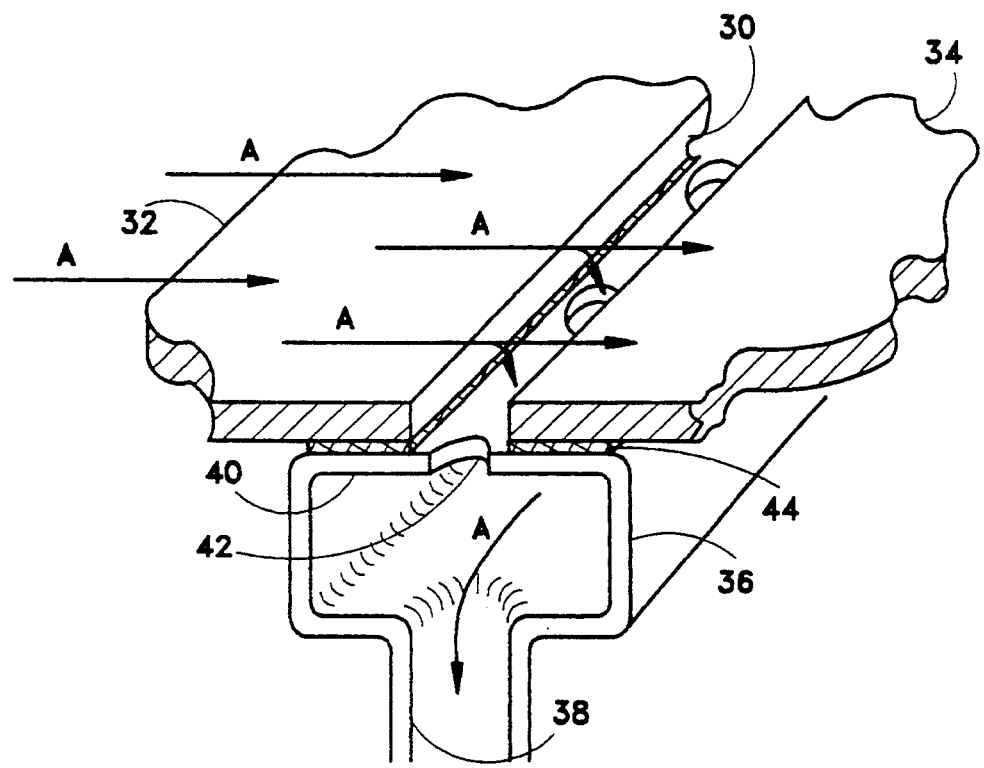
FIG. 2 is a perspective view of a embodiment of a system for maintaining laminar flow past nacelle skin gaps in accordance with this invention, cut away along line 2—2 in FIG. 1.

FIG. 2 is a perspective view of a first embodiment of a system for eliminating turbulence in air flowing across gap 30 along a line generally perpendicular to the gap, typically taken on line 2—2 in FIG. 1, and which is shown enlarged for ease of illustration. Typically, one side of gap 30 is a fixed skin portion 32 and the other side is formed by a moveable skin portion 34, such as a removable access panel 24. Both skins 32 and 34 could be moveable or both could be fixed. The skin portions 32 and 34 may be simple aluminum sheets, or may be more elaborate, such as a metal or an advanced composite skin surface, backed by noise reduction material, reinforcements, housings or the like. For the purposes of this application, "skin" will be understood to include multi-component skin structures.

A plenum 36, here having an outlet 38, has a top portion 40 that covers the bottom of gap 30 and may be fastened to fixed plate 32, such as by rivets (not shown). A plurality of suitably sized and spaced apertures 42 are formed, such as by conventional drilling, through top 40 into gap 30 to provide fluid flow communication between the gap 30 and the chamber 36. At least one duct 36 is secured to an opening in chamber 38 and extends to a conventional suction or vacuum pump (not shown) in a manner such that a portion of the air passing over gap 30 is drawn into the gap, through holes 42 and through chamber 36 and outlet. For an exemplary ducting and exhaust system for the laminar flow control of air flowing over an aircraft structure, reference is made to that arrangement disclosed in pending U.S. patent application Ser. No. 07/970,058 filed Nov. 2, 1992 and assigned to the present assignee, and which is incorporated by reference. A suitable seal 44 may also be provided to seal a moveable skin 34 against plenum 36, it also being recognized that the gap 30 may change in size due to thermal conditions caused by operation of the engine.

Thus, laminar air flow passing across gap 30 is prevented from transitioning to a turbulent state. The low drag laminar flow then is able to continue for a distance past gap 30 resulting in lower overall drag and a significant fuel saving.

Any suitable number of apertures 42, having suitable sizes and shapes and appropriately spaced may be used. The optimum number, size, shape and spacing will depend upon the width and depth of gap 30 and the thickness of top 40 through which the apertures 42 pass.

Figure 3:
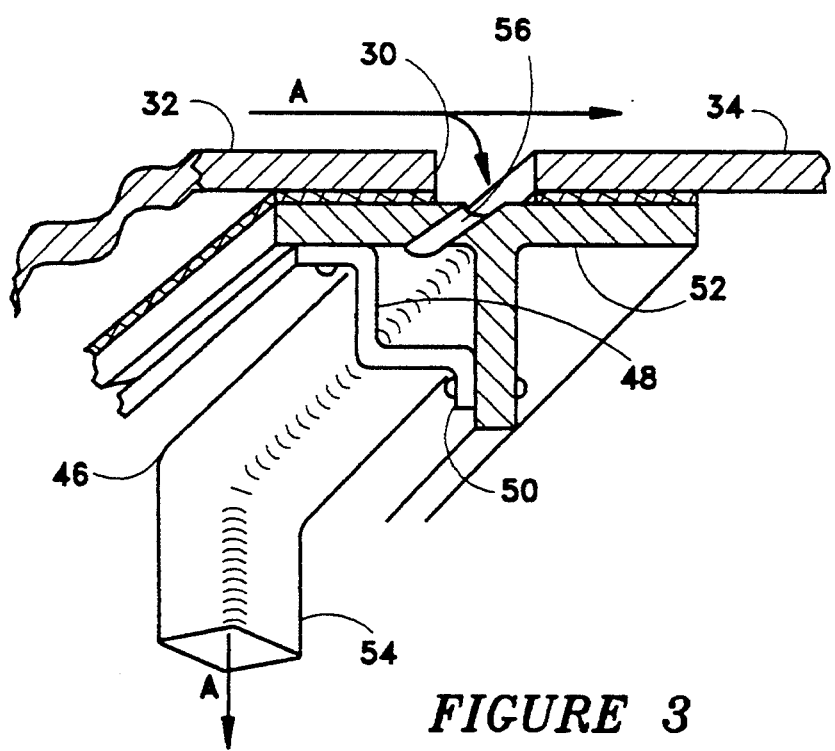
FIG. 3 is a perspective view of a second embodiment of the system of this invention.

FIG. 3 shows a modification of the preferred embodiment of the system for maintaining laminar air flow across nacelle skin gaps or gaps in the outer surfaces of other aircraft structures. In this modification of the invention it has been found expeditious to provide a plenum 46 by providing a longitudinally extended duct 48 having flanges 50 that are suitably attached to a "T" shaped member 52 by riveting or otherwise. The plenum 46 is provided with a suitable suction duct 54 which operates as previously discussed. The "T" shaped member 52 is provided with a plurality of spaced apertures 56 which operate, as before, to provide a suitable suction therethrough to counteract the disturbance in the airflow A presented by the gap 30. Also as before, the size of the gap 30 is shown enlarged for ease of illustration. The apertures 56 are shown as being drilled, or otherwise provided, at a slant to avoid the center rib of the member 52.

Other applications, variations and ramifications of this invention will occur to those skilled in the art upon reading this disclosure. Those are intended to be included within the scope of this invention, as defined in the appended claims.

It should also be understood that the present invention is not limited to providing apertures of uniform size and having uniform spacing. It is within the scope of the invention to provide apertures having non-uniform size and having non-uniform spacing. It may also be desirable at times to provide baffles within the plenum chamber as required. The point is that while the main objective is to provide a uniform suction within the gap and tailoring of the structure may be required to achieve this, it may also be desirable to provide non-uniform suction along the gap if required to maintain laminar flow of the air passing over the nacelle surface at that point.

The invention may be embodied in other specific forms without departing from the spirit and essential characteristics thereof. The present embodiments are therefore to be considered in all respects as illustrative and not restrictive, the scope of the invention being indicated by the appended claims rather than by the foregoing description; and all variations, substitutions and changes which come within the meaning and range of equivalency of the claims are therefore intended to be embraced herein.

What is claimed is:

1. A system for maintaining laminar flow over gaps in an aerodynamic aircraft engine nacelle surface which comprises:

a nacelle skin surface having at least one elongated gap in said surface skin between the ends of a first skin portion and a second skin portion;

elongated unitary plenum chamber means having a top portion which abuts the inner margins of said first and second skin portions to close the bottom of said gap within said skin;

a plurality of spaced apertures provided in said top portion of said plenum chamber means and arranged longitudinally along such gap and providing fluid flow communication between said gap and said plenum chamber means;

outlet duct means having a first end communicating with said chamber means and a second end adapted to be connected to a suction pump means, whereby air can be drawn through said duct means, plenum chamber, apertures, and gap so that laminar air flow over said gap is prevented from transitioning to turbulent flow.

2. The system according to claim 1 wherein the top portion of the plenum chamber means is planar shaped for receiving the first and second skin portions thereon.

3. The system according to claim 2 wherein a seal means is interposed between at least one moveable skin portion and the top portion of the plenum chamber means.

4. The system according to claim 3 wherein the outlet duct means communicates with the plenum chamber at a position which opposes the apertures provided in the top portion of such plenum chamber means.

5. The system according to claim 3 wherein the width of said gap varies during engine operation and said seal is capable of sliding on said skin to accommodate skin movement.

6. A system for maintaining laminar flow over gaps in an aerodynamic nacelle surface which comprises:
- a nacelle skin surface having at least one elongated gap in said surface skin between a first skin portion and a second skin portion;
- backing means closing the bottom of said gap within said skin;
- said backing means including a "T" shaped member having the "T" top in contact with the inner surface of said skin portions on both sides of said gap;
- elongated wall means having a first elongated edge secured to the leg of said "T" shaped member and to the inner side of said "T" top, forming with said "T" member a closed chamber;
- a plurality of apertures extending through said "T" top and providing fluid flow communication between said gap and said chamber;
- suction duct means having a first end communicating with said closed chamber and a second end adapted to be coupled to a suction means;
- whereby air can be sucked through said suction duct means, closed chamber, apertures, and gap so that laminar air flow over said gap is prevented from transitioning to turbulent flow.

7. A system according to claim 6 wherein at least one skin portion is fixed and the other skin portion is moveable.

8. A system according to claim 6 wherein both the first and second skin portions are moveable.

9. A system according to claim 6 wherein seal means is interposed between at least one skin portion and the "T" top of the "T" shaped member.

10. A system according to claim 6 wherein the plurality of apertures are spaced along the "T" top of the "T" member at intervals sufficiently close to provide relatively uniform suction along the length of the gap.

* * * * *